United States Patent Office 2,783,224
Patented Feb. 26, 1957

2,783,224

SALTS OF 2,6-DIAMINO-3-PHENYLAZO-PYRIDINE

Daniel M. Green, Bronxville, and Bernard F. Duesel, Yonkers, N. Y., assignors to Nepera Chemical Co., Inc., Yonkers, N. Y., a corporation of New York No Drawing. Application August 18, 1955,
Serial No. 529,344

8 Claims. (Cl. 260—156)

This invention relates to certain novel anti-bacterial salts and relates more particularly to the 2,6-diamino-3-phenylazo-pyridine salts of certain sulfonamide compounds, more particularly, 2 - sulfanilamido - 5 - methyl-1,3,4 - thiadiazole, N' - acetyl - sulfanilamide and N'-(3,4-dimethyl-5-isoxazolyl)-sulfanilamide.

An object of our invention is the preparation of salt compounds containing 2,6 - diamino - 3 - phenylazo-pyridine coupled to a sulfonamide compound in stoichiometric ratio. Another object of our invention is the provision of 2,6 - diamino - 3 - phenylazo - pyridine salts of certain sulfonamides which are well defined crystalline compounds and which are useful therapeutically in bacterial infections, and especially, bacterial infections involving the urinary tract.

Other objects of this invention will appear from the following detailed description.

The therapeutic value of various sulfonamide compounds in bacterial infections is well known and the extensive literature available is evidence of the exhaustive clinical studies to which these compounds have been subjected. Similarly, 2,6 - diamino - 3 - phenylazo-pyridine has been widely used for an extensive period as a urinary analgesic and both the value and safety of this compound have been fully established.

We have now found that 2,6 - diamino - 3 - phenyl-azo-pyridine will form well-defined crystalline salts with certain sulfonamide compounds and the salts obtained may be employed therapeutically with excellent results in those conditions where both the antibacterial activity of a sulfonamide and the analgesic action of said azo compound are desired. Surprisingly enough, the antibacterial activity of these salts has been far greater than would be expected on the basis of the sulfonamide component. For example, since the molecular weights of 2,6 - diamino - 3 - phenylazo - pyridine and 2 - sulfonamido - 5 - methyl - 1,3,4 - thiadiazole are approximately the same, the salt formed by said compounds contains approximately equal amounts of each compound by weight. In the treatment of Klebsiella pneumonia infections, however, while dosages of from 1200 to 2400 milligrams per kilogram of the salt have been found to be quite effective in combatting this organism, dosages of from 600 to 1200 milligrams per kilogram of the free 2 - sulfonamido - 5 - methyl - 1,3,4 - thiadiazole itself are ineffective. The chemical combination of this sulfonamide in the form of its salt with 2,6 - diamino-3-phenylazo-pyridine greatly increases the effectiveness of the sulfonamide. At the same time the analgesic properties of the azo component are retained in the novel salts of our invention.

These novel salts may be obtained by dissolving substantially equimolecular quantities of both the sulfonamide and 2,6 - diamino - 3 - phenylazo - pyridine in a suitable solvent, the mixture heated to form a solution and the latter then cooled to precipitate the salt which forms. Ethanol is a suitable solvent. Water is also satisfactory when the water-soluble hydrochloride of 2,6 - diamino - 3 - phenylazo - pyridine is employed. Alternatively, the sulfonamide and 2,6 - diamino - 3 - phenylazo-pyridine may be mixed in a dry state and heated until the mixture has melted. On cooling, the desired salt is obtained. The salt thus obtained may be further purified by recrystallization from ethanol, for example, or other solvent.

For a sulfonamide compound to form a stable salt with 2,6 - diamino - 3 - phenylazo - pyridine, it must be sufficiently acid. Not all sulfonamide compounds are sufficiently acid to form such salts.

In order further to illustrate this invention, but without being limited thereto, the following examples are given:

*Example I*

31.8 parts by weight of 2,6-diamino-3-phenylazo-pyridine are dissolved in about 250 parts by weight of hot, 95% ethanol and the solution formed added to a hot solution of 40.5 parts by weight of 2-sulfanilamido-5-methyl-1,3,4-thiadiazole in about 480 parts by weight of 95% ethanol. The mixture is stirred and then allowed to cool slowly to room temperature. A yellow, crystalline solid forms and is filtered off and pressed free of solvent. After washing with about 40 parts by weight of cold, 95% ethanol, the solid, crystalline salt is dried at 60° C. to constant weight. The dried salt melts at 175–176° C. and on analysis is found to contain 44.4% by weight of 2,6 - diamino - 3 - phenylazo - pyridine, the theoretical amount being 44%.

*Example II*

1.06 parts by weight of 2,6-diamino-3-phenylazo-pyridine are intimately mixed in a dry state with 1.35 parts by weight of 2-sulfanilamido-5-methyl-1,3,4-thiadiazole. The mixture is heated gently and melts at 95–100° C. to form a clear red liquid which, on cooling, forms an orange-red solid which is then heated for a short time at 130° C. After recrystallization from 95% ethanol, the orange-red solid obtained melts at 176° C. The 2,6 - diamino - 3 - phenylazo - pyridine salt of 2 - sulfanilamido - 5 - methyl - 1,3,4 - thiadiazole thus obtained is identical with that obtained by the solvent method described in Example I.

*Example III*

2.49 parts by weight of 2,6-diamino-3-phenylazo-pyridine hydrochloride are dissolved in 200 parts by weight of water and 2.7 parts by weight of 2-sulfanilamido-5-methyl-1,3,4-thiadiazole added to the aqueous solution. On heating the mixture a clear, deep red solution is formed. The solution is brought to a pH of 5.4 by adding 1 N aqueous sodium hydroxide and an orange-yellow precipitate is formed. The precipitate is filtered off, washed with water and then recrystallized from 95% ethanol. The salt of 2,6 - diamino - 3 - phenylazo - pyridine and 2 - sulfanilamido - 5 - methyl - 1,3,4 - thiadiazole thus obtained melts at 176° C. and is identical with that obtained in accordance with the above examples.

*Example IV*

42.6 parts by weight of 2,6-diamino-3-phenylazo-pyridine are dissolved in 340 parts by weight of 95% ethanol heated on a steam bath and 42.8 parts by weight of N'-acetyl-sulfonamide are added. A clear solution is formed and the latter allowed to cool slowly for several hours. A precipitate of orange-yellow crystals forms and the latter are filtered off and washed with 95% ethanol. The crystalline product is recrystallized from 95% ethanol and the crystalline salt of 2,6-diamino-3-phenylazo-pyridine and N'-acetyl-sulfonamide thus obtained melts at 152° C. This salt may also be obtained by the methods described in Examples II and III.

*Example V*

1.35 parts by weight of N'-(3,4-dimethyl-5-isoxazolyl)-sulfanilamide are dissolved in about 7.8 parts by weight of acetone and 1.06 parts by weight of 2,6-diamino-3-phenylazo-pyridine are added. On warming, a clear solution is obtained and when this solution is cooled slowly, fine orange-yellow needles precipitate. The crystals are filtered off, washed with a mixture of equal parts of acetone and water and dried. This crystalline salt of 2,6-diamino-3-phenylazo-pyridine and N'-(3,4-dimethyl-5-isoxazolyl) sulfanilamide melts at 126–127° C. This salt may also be obtained by the method of Examples II and III.

It is understood that the foregoing detailed description is given merely by way of illustration and that many variations may be made therein without departing from the spirit of our invention.

Having described our invention, what we desire to secure by Letters Patent is:

1. The 2,6-diamino-3-phenylazo-pyridine salt of a member of the group consisting of 2-sulfanilamido-5-methyl-1,3,4-thiadiazole, N'-acetyl-sulfanilamide and N'-(3,4-dimethyl-5-isoxazolyl)-sulfanilamide.

2. The 2,6-diamino-3-phenylazo-pyridine salt of 2-sulfonamido-5-methyl-1,3,4-thiadiazole.

3. The 2,6-diamino-3-phenylazo-pyridine salt of N'-acetyl-sulfanilamide.

4. The 2,6-diamino-3-phenylazo-pyridine salt of N'-(3,4-dimethyl-5-isoxazolyl)-sulfanilamide.

5. Process for the preparation of a salt of 2,6-diamino-3-phenylazo-pyridine with a sulfonamide compound, which comprises heating a solution containing 2,6-diamino-3-phenylazo-pyridine and a member of the group consisting of 2-sulfanilamido-5-methyl-1,3,4-thiadiazole, N'-acetyl-sulfanilamide and N'-(3,4-dimethyl-5-isoxazolyl)-sulfanilamide, cooling said solution and separating a salt of 2,6-diamino-3-phenylazo-pyridine and said sulfonamide compound therefrom.

6. Process for the preparation of a salt of 2-6-diamino-3-phenylazo-pyridine with a sulfonamide compound, which comprises fusing a mixture of 2,6-diamino-3-phenylazo-pyridine and a member of the group consisting of 2-sulfanilamido-5-methyl-1,3,4-thiadiazole, N'-acetyl-sulfanilamide and N'-(3,4-dimethyl-5-isoxazolyl)-sulfanilamide, cooling the melt and separating a salt of 2,6-diamino-3-phenylazo-pyridine and said sulfonamide compound therefrom.

7. Process for the preparation of a salt of 2,6-diamino-3-phenylazo-pyridine with a sulfonamide compound, which comprises dissolving a soluble inorganic acid salt of 2,6-diamino-3-phenylazo-pyridine in water, adding a member of the group consisting of 2-sulfanilamido-5-methyl-1,3,4-thiadiazole, N'-acetyl-sulfanilamide and N'-(3,4-dimethyl-5-isoxazolyl)-sulfanilamide to said aqueous solution, heating the solution to dissolve said sulfanilamide compound, making the aqueous solution alkaline and separating a salt of 2,6-diamino-3-phenylazo-pyridine and said sulfonamide compound from said aqueous solution.

8. Process for the preparation of a salt of 2,6-diamino-3-phenylazo-pyridine with a sulfonamide compound, which comprises heating an ethyl alcohol solution containing 2,6-diamino-3-phenylazo-pyridine and a member of the group consisting of 2-sulfanilamido-5-methyl-1,3,4-thiadiazole, N'-acetyl-sulfanilamide and N'-(3,4-dimethyl-5-isoxazolyl)-sulfanilamide, cooling said solution and separating a salt of 2,6-diamino-3-phenylazo-pyridine and said sulfonamide compound therefrom.

References Cited in the file of this patent

UNITED STATES PATENTS

| | | |
|---|---|---|
| 1,680,108 | Ostromislensky | Aug. 7, 1926 |
| 2,148,705 | Mietzsch et al. | Feb. 28, 1939 |
| 2,307,650 | Tisza et al. | Jan. 5, 1943 |
| 2,419,230 | Ruskin | Apr. 22, 1947 |

FOREIGN PATENTS

| | | |
|---|---|---|
| 840,545 | Germany | June 3, 1952 |